(12) United States Patent
Biernath et al.

(10) Patent No.: US 8,228,463 B2
(45) Date of Patent: Jul. 24, 2012

(54) PASSIVE DAYLIGHT-COUPLED BACKLIGHT WITH TURNING FILM HAVING PRISMS WITH CHAOS FOR SUNLIGHT VIEWABLE DISPLAYS

(75) Inventors: Rolf W. Biernath, Wyoming, MN (US); Jennifer R. Yi, Woodbury, MN (US); Gilles J. Benoit, Minneapolis, MN (US); Yufeng Liu, Woodbury, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 462 days.

(21) Appl. No.: 12/620,957

(22) Filed: Nov. 18, 2009

(65) Prior Publication Data

US 2011/0116012 A1    May 19, 2011

(51) Int. Cl.
*G02F 1/1335* (2006.01)

(52) U.S. Cl. ............ 349/64; 349/67; 362/560; 362/561; 362/606

(58) Field of Classification Search .................... 349/67; 362/560, 561, 606
See application file for complete search history.

(56) References Cited

U.S. PATENT DOCUMENTS

| | | | |
|---|---|---|---|
| 3,828,909 A | 8/1974 | Roamo et al. | |
| 3,838,565 A | 10/1974 | Carlyle | |
| 3,838,909 A | 10/1974 | Fitzgibbons | |
| 3,966,303 A | 6/1976 | Yamamoto | |
| 4,176,084 A | 11/1979 | Luckenbach | |
| 4,289,383 A | 9/1981 | Schwarzschild | |
| 4,298,249 A | 11/1981 | Gloor et al. | |
| 4,635,128 A | 1/1987 | Toyoda | |
| 5,099,343 A | 3/1992 | Margerum et al. | |
| 5,211,463 A | 5/1993 | Kalmanash | |
| 5,211,493 A | 5/1993 | Stephenson et al. | |
| 5,303,322 A | 4/1994 | Winston et al. | |
| 5,412,492 A | 5/1995 | Zammit et al. | |
| 5,442,522 A | 8/1995 | Kalmanash | |
| 5,479,275 A | 12/1995 | Abileah | |
| 5,479,276 A | 12/1995 | Herbermann | |
| 5,479,328 A | 12/1995 | Lee et al. | |
| 5,510,915 A | 4/1996 | Ge et al. | |
| 5,521,465 A | 5/1996 | Budzilek et al. | |
| 5,739,876 A | 4/1998 | Stewart | |
| 5,760,760 A | 6/1998 | Helms | |
| 5,777,704 A | 7/1998 | Selker | |
| 5,786,801 A | 7/1998 | Ichise | |
| 5,818,553 A | 10/1998 | Koench et al. | |

(Continued)

FOREIGN PATENT DOCUMENTS

CN 101349833 1/2009

(Continued)

OTHER PUBLICATIONS

U.S. Appl. No. 12/492,166, entitled "Passive and Hybrid Daylight-Coupled N-Stack and Collapsible Backlights for Sunlight Viewable Displays" filed Jun. 26, 2009.

*Primary Examiner* — Richard Kim

(57) ABSTRACT

A passive daylight-coupled display having an LCD panel, a diffuser, a turning film behind the LCD panel, and a curved reflector behind the turning film. For passive backlighting, the diffuser transmits daylight to the reflector, which reflects the daylight to the LCD panel through the turning film and provides for substantially uniform distribution of the daylight on the LCD panel for backlighting it. The turning film has prisms with chaos for an improved viewer experience.

22 Claims, 2 Drawing Sheets

U.S. PATENT DOCUMENTS

| | | |
|---|---|---|
| 5,986,728 A | 11/1999 | Bernard |
| 6,034,750 A | 3/2000 | Rai et al. |
| 6,184,946 B1 | 2/2001 | Ando et al. |
| 6,273,577 B1 | 8/2001 | Goto et al. |
| 6,428,198 B1 | 8/2002 | Saccomanno et al. |
| 6,447,132 B1 | 9/2002 | Harter, Jr. |
| 6,592,232 B2 | 7/2003 | McGowan |
| 6,771,331 B1 | 8/2004 | Kubota et al. |
| 6,795,137 B1 | 9/2004 | Whitted et al. |
| 6,929,392 B2 | 8/2005 | Kim et al. |
| 6,961,108 B2 | 11/2005 | Wang et al. |
| 7,027,113 B2 | 4/2006 | Kim et al. |
| 7,121,710 B2 | 10/2006 | Kim et al. |
| 7,213,955 B1 | 5/2007 | Ladouceur et al. |
| 7,306,356 B1 | 12/2007 | Ahmadi |
| 7,427,140 B1 | 9/2008 | Ma |
| 7,430,349 B2 | 9/2008 | Jones |
| 7,510,288 B2 | 3/2009 | Shin et al. |
| 7,513,642 B2 | 4/2009 | Sormani |
| 7,522,775 B2 | 4/2009 | Boon |
| 2002/0114147 A1 | 8/2002 | Harter, Jr. |
| 2003/0095397 A1 | 5/2003 | McGowan |
| 2003/0193457 A1 | 10/2003 | Wang et al. |
| 2003/0201702 A1 | 10/2003 | Kim et al. |
| 2003/0204977 A1 | 11/2003 | Hong |
| 2004/0181989 A1 | 9/2004 | Miller |
| 2004/0252940 A1 | 12/2004 | Atac et al. |
| 2004/0263720 A1 | 12/2004 | Wang et al. |
| 2005/0018106 A1 | 1/2005 | Wang et al. |
| 2005/0146651 A1 | 7/2005 | Whitted et al. |
| 2006/0002140 A1 | 1/2006 | Kim et al. |
| 2007/0091635 A1 | 4/2007 | Ladouceur et al. |
| 2007/0171322 A1 | 7/2007 | Shin et al. |
| 2007/0195519 A1 | 8/2007 | Shin et al. |
| 2007/0200972 A1 | 8/2007 | Ladouceur et al. |
| 2007/0273680 A1 | 11/2007 | Yang et al. |
| 2008/0064096 A1 | 3/2008 | Renauld et al. |
| 2008/0064115 A1 | 3/2008 | Hiramatsu et al. |
| 2008/0064133 A1 | 3/2008 | Lee et al. |
| 2008/0117346 A1 | 5/2008 | Jepson |
| 2008/0201999 A1 | 8/2008 | Chung et al. |
| 2008/0266850 A1 | 10/2008 | Masri |
| 2009/0027591 A1 | 1/2009 | Hwang et al. |
| 2009/0027921 A1 | 1/2009 | Chou et al. |
| 2009/0061945 A1 | 3/2009 | Ma |
| 2009/0213041 A1 | 8/2009 | Unger et al. |
| 2010/0073791 A1 | 3/2010 | Mahowald |
| 2010/0141869 A1 | 6/2010 | Biernath et al. |
| 2010/0165001 A1 | 7/2010 | Savvateev et al. |

FOREIGN PATENT DOCUMENTS

| | | |
|---|---|---|
| DE | 3834492 | 10/1988 |
| EP | 0 399 506 | 5/1990 |
| FR | 2866464 | 2/2004 |
| GB | 2 370 404 | 6/2002 |
| GB | 2 405 252 | 2/2005 |
| JP | 07-094008 | 4/1995 |
| JP | 07-248492 | 9/1995 |
| JP | 09-297305 | 11/1997 |
| JP | 10-48615 | 2/1998 |
| JP | 10-068948 | 3/1998 |
| JP | 10-123507 | 5/1998 |
| JP | 11-202784 | 7/1999 |
| JP | 2000-187450 | 7/2000 |
| JP | 2002-150822 | 5/2002 |
| JP | 2006-189609 | 7/2006 |
| KR | 2006-071000 | 6/2006 |
| KR | 2008-089709 | 4/2007 |
| KR | 2009-008928 | 1/2009 |
| TW | 2006/19758 | 6/2006 |

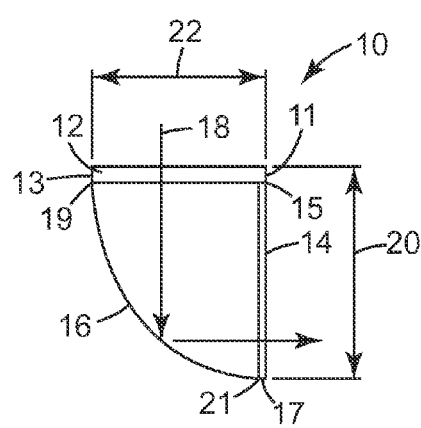
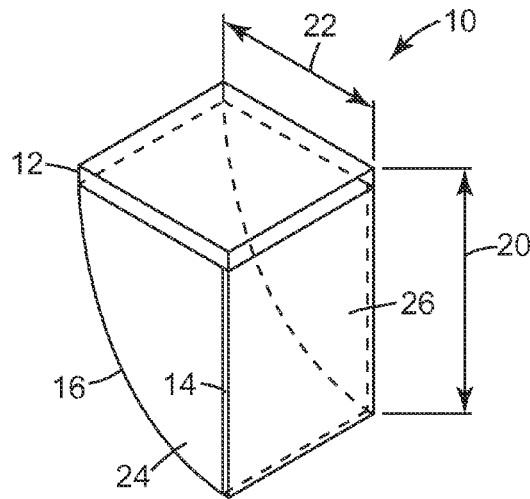
Fig. 1    Fig. 2
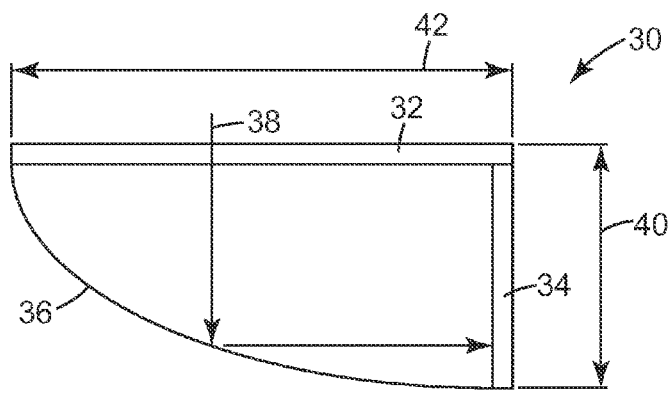
Fig. 3
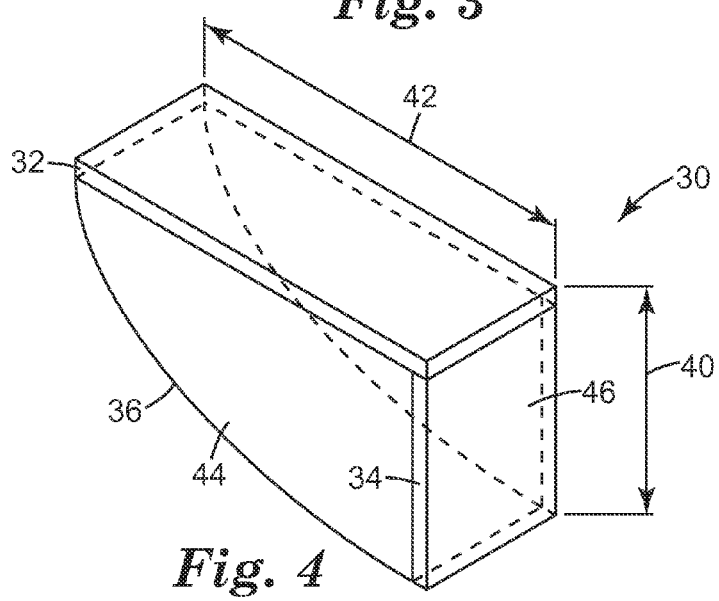
Fig. 4

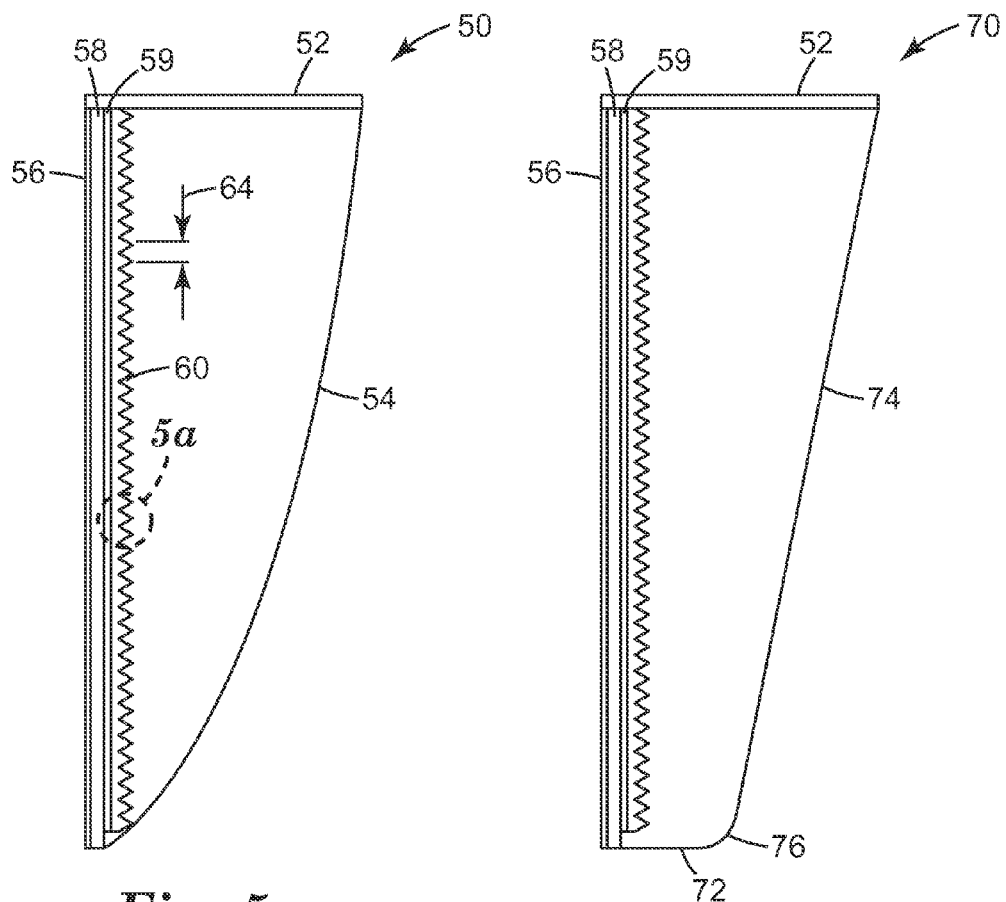
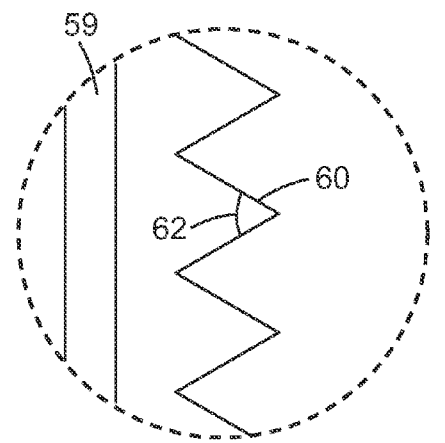

PASSIVE DAYLIGHT-COUPLED BACKLIGHT WITH TURNING FILM HAVING PRISMS WITH CHAOS FOR SUNLIGHT VIEWABLE DISPLAYS

BACKGROUND

Sunlight viewability of digital displays, such as a liquid crystal display (LCD), is increasing in business importance as such displays become more ubiquitous. Advertisers desire the ability to use digital media in outdoor environments, and consumers would like their electronics to be usable everywhere. Current solutions to the outdoor sunlight visibility problem fall short because of insufficient display brightness or excessive power consumption and its resultant heat load. For example, one solution achieves 2000 nits brightness by using 720 three watt LEDs in a 40 inch display, which requires a liquid cooling system to dissipate the 2.1 kW of heat. Also, the display with backlight weighs 110 lbs., a significant amount of weight for such a display.

SUMMARY

A passive daylight-coupled display, consistent with the present invention, includes an LCD panel having a top side and a bottom side, a diffuser having a front edge adjacent the top side of the LCD panel and having a back edge, and a curved reflector having a top side adjacent the back edge of the diffuser and having a bottom side adjacent the bottom side of the LCD panel. The display also includes a turning film located behind the LCD panel, and optionally a reflective polarizer located between the LCD panel and the turning film. The diffuser transmits daylight to the reflector, and the reflector reflects the daylight to the LCD panel and provides for substantially uniform distribution of the daylight on the LCD panel. The turning film gathers light from the diffuser and directs it toward the LCD panel. The turning film also has chaos in the prisms for an improved viewer experience.

BRIEF DESCRIPTION OF THE DRAWINGS

The accompanying drawings are incorporated in and constitute a part of this specification and, together with the description, explain the advantages and principles of the invention. In the drawings, FIG. 1 is a side view of a first daylight-coupled LCD device;

FIG. 2 is a perspective view of the daylight-coupled LCD device of FIG. 1;

FIG. 3 is a side view of a second daylight-coupled LCD device;

FIG. 4 is a perspective view of the daylight-coupled LCD device of FIG. 3;

FIG. 5 is a side view of a daylight-coupled LCD device with a turning film and curved reflector;

FIG. 5a is a diagram illustrating the prism angles for the turning film of FIG. 5; and FIG. 6 is a diagram illustrating an alternative arrangement of the back reflector, suitable for use with highly diffuse back reflector materials.

DETAILED DESCRIPTION

Using sunlight as a source of illumination for a display helps to save electrical power, enabling a more energy-efficient display. The daylight-coupled backlight provides a daylight-viewable solution that is potentially solar powered and also produces a high brightness display. At night-time or other low ambient light conditions, the backlight can be supplemented with an active light source. By using the sun to light the backlight, it saves a substantial power load and enables an energy efficient display, daylight viewable, that is potentially completely solar powered and also produces a high brightness display.

Daylight-coupled LCD devices can be used in a variety of outdoor settings for digital signage, traffic signage, or to display of other types of information. The devices can be housed in a kiosk or other types of enclosures depending upon, for example, a desired use of the devices. The devices can be used on bus shelters, sides of buildings, trucks, trailers, or other outdoor locations for advertisement or other information presentation. They can also be used in a variety of indoor settings to display information or advertisement in store-front windows, high-ambient mall courtyards, or other locations. They can also be used inside of a car to display information on the center stack, driver cluster or dashboard. They can be mounted on the backside of the headrests or from the ceiling to display entertainment within a vehicle. The devices can also be in a smaller form factor as well—display diagonals less than 7 inches. The display panels in the devices can be arranged in a portrait mode or a landscape mode for display of information. They may also be set side by side to simulate a larger display or make for a group of displays.

The term LCD is used here to represent the variety of liquid crystal panels currently available on the market and those that may become available in the future, including, but not limited to conventional TN panels; PVA, MVA or OCB mode panels; and transflective panels. Additionally, the LCD panels may be substituted with other backlit light-valve type displays, other backlit electronic displays, electronic signage, or static signage. Also, the LCD panels may be substituted with solar panels to enhance the amount of daylight upon the solar panels or allow the solar panels to be configured in varying orientations, or the LCD panels may be substituted with other devices requiring illumination. The backlight can be designed to be collapsible so that it functions as a more conventional backlight in its collapsed state, but by means of hinges, springs, or slides, rearranges to form the backlight described in the present specification. Additionally, it may be designed to be collapsible for purposes of transportation or storage.

Preferably, highly reflective surfaces are used throughout the cavity. However, optionally, diffusers may be added at various locations, such as behind the LCD panel, for example, to hide seams or interfaces between components. All diffusers in the system, including the entrance aperture, may be passive such as bead coated films and bulk diffuser plates, or they may be actively controlled such as PDLC (Polymer Dispersed Liquid Crystal) films or plates, for example. The diffusers may be uniform in characteristics or non-uniform, such as printed dot extractors, variable density films or plates, or other patterned systems.

Examples of various passive and hybrid backlights are disclosed in the following: U.S. patent application Ser. No. 12/330,155, entitled "Passive and Hybrid Daylight-Coupled Backlights for Sunlight Viewable Displays, and filed Dec. 8, 2008; and U.S. patent application Ser. No. 12/492,166, entitled "Passive and Hybrid Daylight-Coupled N-Stack and Collapsible Backlights for Sunlight Viewable Displays, and filed Jun. 26, 2009, both of which are incorporated herein by reference as if fully set forth.

Passive Daylight-Coupled Display

FIG. 1 is a side view of a first daylight-coupled LCD device 10, and FIG. 2 is a perspective view of the daylight-coupled LCD device 10. Device 10 includes an LCD panel 14 having a top side 15 and a bottom side 17, a diffuser 12 having a front edge 11 and a back edge 13, a curved reflector 16 having a top side 19 and a bottom side 21, and side panels 24 and 26. Device 10 has a height 20 and depth 22.

As represented by arrow 18, diffuser 12 transmits at least some daylight to reflector 16 and possibly to other components. Reflector 16 then reflects the light upon LCD panel 14 in order to provide backlighting for the LCD panel. Device 10 is designed with a depth 22 and curvature of reflector 16 such that reflector 16 provides for substantially uniform distribution of the reflected daylight onto LCD panel 14. With a circular shape for reflector 16, meaning that it forms a portion of a circle, the ratio of the height 20 to depth 22 is approximately 1 to 1. In other embodiments, particular if a turning film is used behind the LCD panel, the ratio of the height of the LCD panel to the depth of the diffuser is approximately 1 to 0.5. A stacked reflector configuration can realize a preferred ratio of 1 to 0.375. In device 10, and in other daylight-coupled LCD devices, diffuser 12 is preferably positioned at an angle of approximately 90° with respect to LCD panel 14, although the angle can be greater than 120° and can also be less than 90°.

By using daylight for passive backlighting, the device can be used during the daytime in outdoor settings without the need for an active light source, thus saving power and reducing heat load on the device. To maintain brightness, an active light source can be used during cloudy conditions. If brightness under cloudy or dim ambient lighting is not a concern, then an active light source is not needed. In addition to using sunlight, the device 10 can use other external light sources for passive backlighting, such as streetlights, spotlights, projectors, or overhead fluorescent lights. All the external light sources can be combined and concentrated for the passive backlight using, for example, lenses, light pipes, mirrors, or ambient light concentrators.

FIG. 3 is a side view of a second daylight-coupled LCD device 30, and FIG. 4 is a perspective view of the daylight-coupled LCD device 30. Device 30 includes an LCD panel 34, a diffuser 32, a curved reflector 36, and side panels 44 and 46. Device 30 has a height 40 and depth 42.

As represented by arrow 38, diffuser 32 transmits at least some daylight to reflector 36 and possibly to other components. Reflector 36 then reflects the light upon LCD panel 34 in order to provide backlighting for the LCD panel. Device 30 is designed with a depth 42 and curvature of reflector 36 such that reflector 36 provides for substantially uniform distribution of the reflected daylight onto LCD panel 34. Having a deeper diffuser cavity, such as that shown in device 30 in comparison to device 10, can allow the diffuser to collect more light for the reflector and backlighting of the LCD panel, thereby enabling a wider viewing angle both horizontally and vertically. With a parabolic shape for reflector 36, meaning that it forms a portion of a parabola, the ratio of the height 40 to depth 42 can be approximately 1 to 3.

Although circular and parabolic shapes are shown for the reflectors, other shapes are possible, including a three-dimensional (3D) curvature or a straight reflector. Also, the shape of the reflector can be variable. For a shaped reflector, it is preferably shaped as a section of a parabola and is arranged with edges meeting the diffuser and LCD panel at an angle of approximately 20° to 40° to axes normal to the diffuser and LCD panel.

The diffusers in daylight-coupled LCD devices, such as diffusers 12 and 32, can be implemented with, for example, one or more of the following: beaded gain diffusers; microstructured gain diffusers; diffuser sheet materials such as bulk diffusers (particle filled, phase separated, or microcavitated); or diffuser plates. The diffuser can optionally be domed or faceted for collecting or concentrating the daylight or other light source. Diffusers 12 and 32 preferably block ultraviolet (UV) light, and reflectors 16 and 36 preferably transmit infrared (IR) light to avoid heat loading on the LCD device. The diffusers can provide sufficient diffusion of light to achieve uniform backlighting, and the diffusers typically transmit as least 50%, more preferably at least 70%, and most preferably at least 90% of the visible light incident upon them, while exhibiting low clarity as measured by the Haze-Gard product from BYK-Gardner USA. The diffuser shape may be flat, curved as for a dome or partial dome, or faceted. Additional collector optics and protective optics may be used over the diffuser, such as light collectors and light concentrators under protective domes. These light collection or concentration optics can be separate components over the diffuser or contained within an integrated unit with the diffuser.

The reflectors in daylight-coupled LCD devices, such as reflectors 16 and 36, can be implemented with, for example, one or more of the following: a polymeric multilayer interference reflector film such as the Enhanced Specular Reflector (ESR) film from 3M Company; a reflective polarizer; a reflective polarizing film; MIRO or MIRO Silver from Anomet, Inc., Ontario, Canada; or the silvered or aluminized Mylar product from E. I. DuPont DeNemours and Company. The films or reflective surfaces may optionally be affixed to supporting structures.

Reflective polarizers are films that reflect one polarization preferentially over the other polarization. Reflective polarizer types include multilayer-based, blend or dispersed phase based, fiber-based, cholesteric liquid crystal-based, wire grid, or Brewster-angle effect polarizers. Specifically, multilayer reflective polarizers can be implemented with the following: DBEF (brightness enhancement film), such as DBEF-Q, D-400, and D2-400, all from 3M Company; Advanced Polarizing Film (APF), such as the LEF-D product, also from 3M Company; and other multilayer variants. These multilayer reflective polarizers can also provide for haze by having a low haze surface or matte finish. The DBEF-D400 film has 60% haze in both polycarbonate layers, and the stack as a whole demonstrates a haze of 72%+/−10%. The LEF-D product has 12% haze in one of the polycarbonate layers and 20% in the other, and the overall haze of stack is 41%+/−10%. A specific example of blend or dispersed phase reflective polarizers include DRPF, also from 3M Company. Brewster Angle reflective polarizers can be built using the "pile of plates" phenomenon. A preferred reflective polarizer is APF, which includes both the specular APF and LEF-D, which is APF sandwiched in-between two hazy polycarbonate films.

Use of a polymeric multilayer interference reflector film that transmit IR light leads to a decrease in the temperature of the LCD panel since the panel does not end up receiving and absorbing that IR light. Reflectors 16 and 36 preferably transmit infrared (IR) light to avoid heat loading on the LCD device. The reflector can optionally be faceted or coated to provide for particular visual effects and can also optionally include a bead coated or microstructured coated film or a low haze coating. The reflector films can be supported by, for example, polymethyl methacrylate (PMMA) or other plastic plate, polymeric multilayer interference reflector film on stainless steel, or aluminum if additional mechanical support is desired. If a metal support or other material that reflects IR is used to support the polymeric multilayer interference reflector film, then it is preferable to reject IR before it enters the backlight cavity, for example using an IR mirror film, such as the Prestige or Crystalline film products from 3M Company, on or under the diffuser plate, to reject the incident IR light. The reflectors preferably have a smooth curved shape when in use, although a curved shape having non-smooth portions can also be used. The reflectors are preferably better than 80% reflective in the visible, and more preferably 90% or higher, and most preferably 98% or higher reflectivity. An example of such a film is the ESR film.

The side panels in daylight-coupled LCD devices, such as panels 24, 26, 44, and 46, can be implemented with, for example, the following: polymeric multilayer interference reflector film; a silvered reflector such as the Silverlux product from 3M Company; a Lambertian reflector; a reflective fabric; or a diffuser plate. The panels can be implemented with separate components. Alternatively, the side panels and reflector can be formed together as a 3D cavity such as with a thermoformed reflector cavity.

The diffuser, reflector, and side panels in daylight-coupled LCD devices can be held together with a frame, for example. The components of the daylight-coupled LCD device can be adjacent one another by being in direct contact, by being connected through one or more other components such as a frame, or by being held next to one another or attached to one another. Adjacent components can optionally include an air gap between them.

Devices 10 and 30, and other daylight-coupled LCD devices, can include additional films on the front of the LCD panel. Examples of those additional films include the following: a shatter protection film such as the anti-splinter film product from 3M Company; an anti-reflective coating or film; an anti-glare film; an IR filter film such as the Prestige or Crystalline film products from 3M Company; and as a single film with multiple functionalities. Likewise, additional films may be used directly on or under the diffuser plate to provide UV protection, IR protection, shatter protection, and color correction. A single film with multiple functionalities can also be used on or under the diffuser plate. Additional films could also be included on the back of the LCD panel, either near, adjacent, or in contact with it. Examples of these films include the following: reflective polarizer film such as the DBEF product from 3M Company; DBEF with a diffuse adhesive; and microreplicated films such as prismatic films or engineered diffusers, or combinations thereof.

Daylight-Coupled Backlight with Turning Film

FIG. 5 is a side view of a daylight-coupled LCD device 50 with a turning film and a curved reflector, and FIG. 5a is a diagram illustrating the prism angles for the turning film. As shown in FIG. 5, device 50 includes an LCD panel 56, a diffuser 52, a curved reflector 54, a reflective polarizer 58, an optional air gap 59, and a turning film 60. Device 50 can operate in a manner similar to devices 10 and 30 described above. In particular, diffuser 52 transmits at least some daylight to reflector 54 and possibly to other components. Reflector 54 then reflects the light upon LCD panel 56 in order to provide backlighting for the LCD panel. Device 50 is designed such that the reflector 54 provides for substantially uniform distribution of the reflected daylight onto LCD panel 56. Turning film 60 provides for the reflected daylight being transmitted substantially normal to LCD panel 56 along a typically viewing axis. Reflective polarizer 58 provides for the correct polarization of the reflected daylight being transmitted to LCD panel 56. Air gap 59 between reflective polarizer 58 and turning film 60 is optional but preferred for performance of device 50. Reflector 54 preferably provides diffusion that spreads primarily along one axis, preferably in a vertical direction with respect to LCD panel 56. Device 50 can have height-to-depth ratios as described above for devices 10 and 30. Also, in device 50 diffuser 52 is preferably positioned at an angle of approximately 90° with respect to LCD panel 56, although it may be positioned at different angles as described above.

The following are examples used to implement the components of device 50. LCD panel 56 includes the exemplary panels described above. Diffuser 52 can be implemented with, for example, an Astra Clarex Diffuser Plate (product nos. DR-50C, 60C, 70C, 75C, 80C, 85C, and 90C), from Astra Products, Inc., Baldwin, N.Y.; the DR-90C diffuser plates can have a transmissivity of approximately 90% and are preferred, although diffusers with a lower transmissivity can also be used. Reflective polarizer 58 includes the exemplary reflective polarizers described above. Reflector 54 can be implemented with diffuser providing diffusion in substantially one direction laminated or otherwise affixed to polymeric multilayer interference reflector film or the LEF or LEF-D products.

The diffuser providing diffusion in substantially one direction is preferred to achieve uniform image output from top to bottom of the device 50. Diffusion in one direction can be obtained by utilizing micro- and nano-fibers embedded in a polymer matrix of different refractive index. The micro- and nano-scale fibers have average diameter from 50 nm to 30 microns with random distribution, preferably from 200 nm to 5 microns. The fibers are preferably oriented in horizontal direction in the display device 50 so as to spreading incoming light in vertical direction to homogenize the displayed image from top to bottom. The diffuser can be made using a mixture of two or more transparent polymers with different refractive indices. Preferably the two or more polymers has index difference larger than 0.03, more preferably larger than 0.05. In one embodiment, a diffuser film providing diffusion in substantially one direction was made via melt extrusion coating process using polypropylene (refractive index of 1.49) and polystyrene (refractive index of 1.58) at compositions that can range from 90 wt:10 wt to 10 wt:90 wt (PP:PS), preferably from 30 wt:70 wt to 50 wt:50 wt. The melt coating process was carefully controlled such that the resulting diffuser film had a spreading ratio (MD:TD) ranging from 1:1.5 to 1:10, preferably from 1:1.8 to 1:5 (MD:TD). Alternatively, the light spreading diffuser (LSD) providing diffusion in substantially one direction can be achieved using a holographic diffuser film with spreading ratio ranging from 1:1.5 to 1:10, preferably from 1:1.8 to 1:5 (MD:TD). This LSD film is available from Luminit, Co. (California), Wavefront Technology, Inc (California), or Edmund Optics, (New Jersey).

Turning film 60, in a preferred embodiment, has the following features: prisms made from Accentrim Resin material from 3M Company; a prism refractive index n=1.4 to 1.7; a 0.005 inch thick (arbitrary thickness) clear polyester backing; prisms having angles of 50° to 80° referring to the internal angle 62, as shown in FIG. 5a, in the prism tips; a pitch of 20 microns to 100 microns referring to the distance 64 between the prism tips; and a chaos of 0.2° to 10°. The chaos means the prism peaks vary in height continuously down web in a single prism and vary in height discontinuously from prism to prism. A wave function can be used to control the peak height variation within particular boundaries. The chaos refers to the average amount of spread of a reflected or transmitted laser beam from or through the film. An example of chaos in prisms of an optical film is described in U.S. Pat. No. 6,354,709, which is incorporated herein by reference as if fully set forth. The various parameters for the preferred turning film can be approximate values in that the refractive index, prism angles, pitch, and chaos may vary among films with similar properties and features. An example of a turning film is described in U.S. Pat. No. 6,356,391, which is incorporated herein by reference as if fully set forth.

Refractive index and prism angle combine to adjust the dominant angle at which light exits the display. Preferably, the refractive index and prism angle are adjusted so that the exit direction (peak brightness) is normal or near normal to the display, although non-normal exit angles can be preferred, such as when the display is above or below the viewer. Alternatively, the combination of prism refractive index and prism angle can be selected so that the peak brightness is within 10° of normal to the display or greater than or equal to 10° normal to the display. The amount of chaos in the film is adjusted to soften the cut-off angle of the exiting light cone, which improves the viewer experience. Too little chaos results in a sharp cut-off and higher peak brightness, whereas too much chaos results in a very soft cut-off and much lower peak brightness.

The components of device 50 can, alternately, be implemented with other types of diffusers, reflectors, and turning films. For example, the back reflector may alternatively be selected to be highly diffusive, for example, using the LEF product from 3M Company. In such a case, the curved back reflector may be segmented into two or more flat (substantially planar) sections, comprising, for example, a back reflector 74 and a bottom reflector 72 to make a device 70 as illustrated in FIG. 6. Aside from the back reflector, device 70 can use the same components and have the same construction as described for device 50.

Back reflector 74 and bottom reflector 72 may be connected by a curved reflector 76. The curvature of curved reflector 76 is preferably selected to minimize any visual artifacts of the intersection between back reflector 74 and bottom reflector 72. The curvature of reflector 76 may be selected to be zero. Reflectors 72, 74, and 76 can be implemented with the exemplary materials described above for the reflector in device 50. Alternatively, other materials for reflectors 72, 74, and 76 include a polystyrene plates, white acrylic plates, white Styrofoam material, or any material with a highly reflective diffuse surface.

The components of devices 50 or 70 can be held together with a frame as described above. Devices 50 or 70 can also include opposing side walls as described above and implemented with, for example, polymeric multilayer interference reflector film or semi-specular mirror film. Devices 50 or 70 can also optionally include the additional films, features, and components as described above for devices 10 and 30 and other daylight-coupled LCD devices. For example, devices 50 and 70 can include internal light sources, such as LEDs, for backlighting the display in dim ambient lighting conditions or to supplement the passive backlighting, and examples of internal light sources in a passively backlit display are described in the applications referenced above.

The invention claimed is:

1. A passive daylight-coupled display, comprising:
an LCD panel having a top side and a bottom side;
a turning film located behind the LCD panel, wherein the turning film has a chaos of 0.2° to 10° in the prisms;
a diffuser having a front edge adjacent the top side of the LCD panel and having a back edge; and
a curved reflector having a top side adjacent the back edge of the diffuser and having a bottom side adjacent the bottom side of the LCD panel,
wherein the diffuser transmits daylight to the reflector, and the reflector reflects the daylight to the LCD panel and provides for substantially uniform distribution of the daylight on the LCD panel.

2. The display of claim 1, further comprising a reflective polarizer located between the LCD panel and the turning film.

3. The display of claim 2, further comprising an air gap between the reflective polarizer and the turning film.

4. The display of claim 1, wherein the reflector is a diffuse reflector.

5. The display of claim 1, wherein the reflector comprises a diffuser providing diffusion in substantially one direction, and a reflector.

6. The display of claim 5, wherein the diffuser provides the diffusion in a vertical direction with respect to the LCD panel.

7. The display of claim 1, wherein the turning film has the following parameters: prisms having a refractive index of 1.4 to 1.7; prisms having prism tip angles of 50° to 80°; and a pitch between prism tips of 20 microns to 100 microns.

8. The display of claim 1, wherein the diffuser has a transmissivity of approximately 90%.

9. The display of claim 1, further comprising opposing side walls extending between the LCD panel and the reflector.

10. The display of claim 9, wherein the side walls each comprise a reflective film.

11. The display of claim 1, wherein the LCD panel is positioned at an angle of approximately 90° to the diffuser.

12. The display of claim 1, wherein a ratio of a height of the LCD panel to a depth of the diffuser is approximately 1 to 1.

13. The display of claim 1, wherein a ratio of a height of the LCD panel to a depth of the diffuser is approximately 1 to 0.5.

14. The display of claim 1, further comprising a film located in front of the LCD panel, wherein the film comprises one or more of the following: a shatter protection film; an anti-glare film; an antireflective film; an IR film; or a single film with multiple functionalities.

15. The display of claim 1, wherein a combination of a prism refractive index and a prism angle of the turning film are selected so that the peak brightness is normal to the display.

16. The display of claim 1, wherein the combination of prism refractive index and prism angle are selected so that the peak brightness is within 10° of normal to the display.

17. The display of claim 1, wherein the combination of prism refractive index and prism angle are selected so that the peak brightness is greater than or equal to 10° of normal to the display.

18. The display of claim 1, further comprising light collection optics adjusting an amount of light incident upon the diffuser.

19. The display of claim 18, wherein the light collection optics further comprise light concentrator optics.

20. The display of claim 1, further comprising a film located under or above the diffuser, wherein the film comprises one or more of the following: a shatter protection film; a UV film; an IR film; a color correction film; or a single film with multiple functionalities.

21. A passive daylight-coupled display, comprising:
an LCD panel having a top side and a bottom side;
a turning film located behind the LCD panel, wherein the turning film has a chaos of 0.2° to 10° in the prisms;
a diffuser having a front edge adjacent the top side of the LCD panel and having a back edge; and
a reflector having a top side adjacent the back edge of the diffuser and having a bottom side adjacent the bottom side of the LCD panel, wherein the top side and bottom side of the reflector are each substantially planar,
wherein the diffuser transmits daylight to the reflector, and the reflector reflects the daylight to the LCD panel and provides for substantially uniform distribution of the daylight on the LCD panel.

22. The display of claim 21, further comprising a curved reflector connecting the top and bottom sides of the reflector.

* * * * *